US007828305B2

(12) United States Patent
Meyers et al.

(10) Patent No.: US 7,828,305 B2
(45) Date of Patent: Nov. 9, 2010

(54) ROLLING WALKER AND HANDLE GRIPS THEREOF

(75) Inventors: Daniel Seth Meyers, Roxboro (CA); Cristian Boar, Montreal (CA)

(73) Assignee: AMG Medical Inc., Montreal, Quebec (CA)

( * ) Notice: Subject to any disclaimer, the term of this patent is extended or adjusted under 35 U.S.C. 154(b) by 329 days.

(21) Appl. No.: 11/745,050

(22) Filed: May 7, 2007

(65) Prior Publication Data
US 2007/0267054 A1    Nov. 22, 2007

Related U.S. Application Data

(63) Continuation-in-part of application No. 11/434,788, filed on May 17, 2006, now Pat. No. 7,540,296.

(51) Int. Cl.
*B62M 1/00* (2010.01)
(52) U.S. Cl. ................... 280/87.021; 16/430; 135/67
(58) Field of Classification Search ............ 280/87.01, 280/87.021, 87.041, 47.39; 135/65, 66, 67; 16/430
See application file for complete search history.

(56) References Cited

U.S. PATENT DOCUMENTS

| D187,842 S | 5/1960 | Jeys |
| 3,363,639 A | 1/1968 | Kurpis |
| 3,768,495 A | 10/1973 | Smith |
| D231,043 S | 3/1974 | Barnett |
| 3,995,650 A | 12/1976 | DiVito |
| 4,730,632 A | 3/1988 | Mace |
| 4,971,088 A | 11/1990 | Lyng |
| 5,356,237 A | 10/1994 | Sung |
| 5,419,571 A | 5/1995 | Vaughan |
| 5,451,193 A | 9/1995 | Pickard |
| 5,482,070 A | 1/1996 | Kelly |
| 5,530,989 A * | 7/1996 | Remmert et al. ............ 16/430 |
| 5,558,358 A | 9/1996 | Johnson |
| 5,605,345 A | 2/1997 | Erfurth et al. |
| 5,772,234 A | 6/1998 | Luo |
| 5,816,593 A | 10/1998 | Che |
| 5,992,434 A | 11/1999 | Berlin et al. |
| 6,024,110 A | 2/2000 | Renfro |
| 6,118,062 A * | 9/2000 | Thoman .................. 84/422.4 |

(Continued)

FOREIGN PATENT DOCUMENTS

WO    PCT/US1995/15560    6/1996

(Continued)

OTHER PUBLICATIONS

Search Report issued by the European Patent Office on corresponding EPO application EP08251559.2318 dated Jul. 7, 2008.231.

(Continued)

*Primary Examiner*—Frank B Vanaman
(74) *Attorney, Agent, or Firm*—Ogilvy Renault LLP

(57) ABSTRACT

A handle grip for ambulatory aid appliances has a soft top portion and a rigid body portion. The handle grips may be attached to a wheeled ambulatory aid appliance such as a rolling walker, wheelchair, stroller and the like in a selected position to provide a comfortable and secure hand grip to a user of the ambulatory aid.

15 Claims, 6 Drawing Sheets

U.S. PATENT DOCUMENTS

| | | | |
|---|---|---|---|
| 6,131,593 | A | 10/2000 | Green et al. |
| 6,338,493 | B1 | 1/2002 | Wohlgemuth et al. |
| 6,378,883 | B1 | 4/2002 | Epstein |
| 6,494,469 | B1 * | 12/2002 | Hara et al. ............. 280/87.041 |
| 6,651,994 | B2 | 11/2003 | Hallgrimsson et al. |
| 6,659,478 | B2 | 12/2003 | Hallgrimsson et al. |
| 6,688,633 | B2 | 2/2004 | Van't Schip |
| 6,721,997 | B2 * | 4/2004 | Hua ............................ 16/431 |
| 6,837,503 | B2 | 1/2005 | Chen et al. |
| 6,877,520 | B2 | 4/2005 | Morris |
| 6,921,101 | B1 | 7/2005 | Lauren et al. |
| D514,307 | S | 2/2006 | Gillebaard |
| 7,032,941 | B2 * | 4/2006 | Heneveld ..................... 294/51 |
| 7,040,637 | B2 | 5/2006 | Owens et al. |
| 7,066,484 | B2 | 6/2006 | Willis et al. |
| 7,073,801 | B2 | 7/2006 | Sanders et al. |
| 2003/0145881 | A1 | 8/2003 | Harroun |
| 2004/0036194 | A1 | 2/2004 | Chadwick et al. |

FOREIGN PATENT DOCUMENTS

WO    PCT/CA2001/01304    3/2002

OTHER PUBLICATIONS

Office Action dated May 17, 2010 issued by the Chinese Patent Office on Applicant's corresponding Chinese Patent Application 200710103964.9 and an English Translation of the same.

* cited by examiner

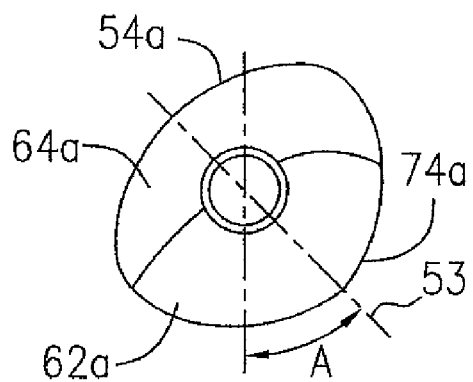
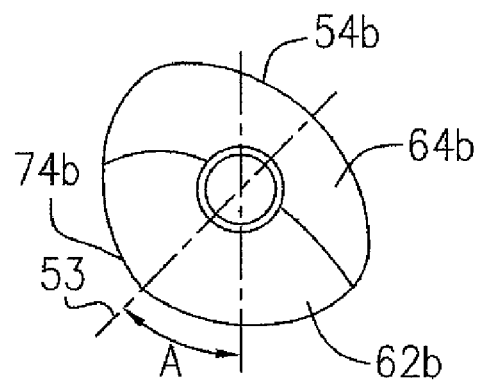
FIG. 6A    FIG. 6B
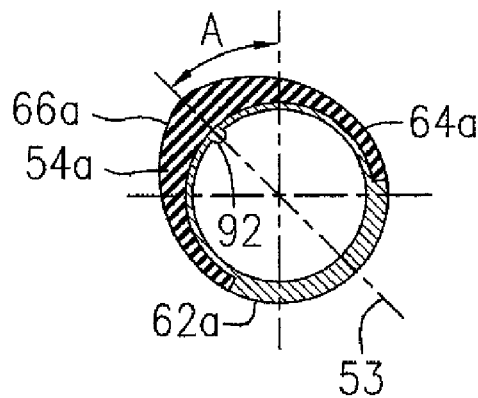
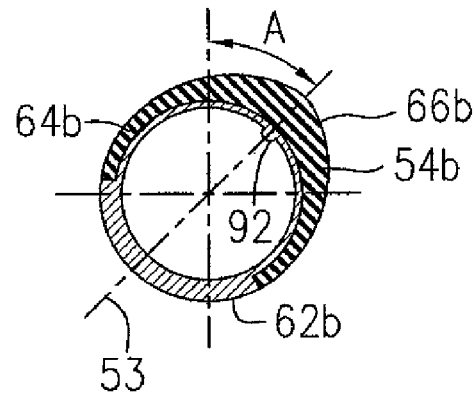
FIG. 7A    FIG. 7B
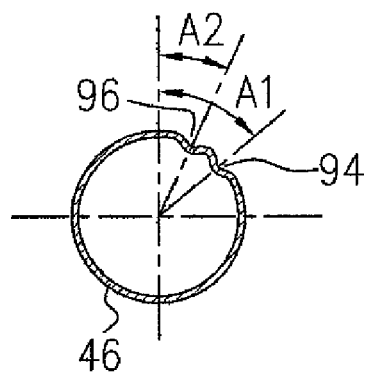
FIG. 8

US 7,828,305 B2

ROLLING WALKER AND HANDLE GRIPS THEREOF

CROSS-REFERENCE TO RELATED APPLICATIONS

This application is a Continuation-In-Part of Applicant's pending application Ser. No. 11/434,788, filed on May 17, 2006.

TECHNICAL FIELD

The present invention relates to an ambulatory aid such as a rolling walker, wheelchair, stroller and the like, and more particularly to handle grips for the ambulatory aid.

BACKGROUND OF THE INVENTION

Ambulatory aid appliances such as rolling walkers, wheelchairs, strollers and the like, may be used in different applications. However, these ambulatory aid appliances all have common features as known in the art. Generally, a rolling walker, wheelchair, stroller and the like includes a frame assembly, a plurality of wheels or rollers rotatably mounted to the frame assembly for moveably supporting the frame assembly on a ground surface, and a pair of handles extending rearwardly from the frame assembly to be gripped by a person walking behind the frame assembly who may be an individual needing assistance for mobility or a caregiver of a care recipient sitting on a seat attached to the frame assembly. Efforts have been made to improve such ambulatory aid appliances in many different aspects thereof, particularly with respect to the configuration and composition of the frame assemblies. However, less attention has been directed to improvement of the handles which need to be comfortably and securely gripped and held by the hands of a user, particularly an individual who needs assistance for mobility.

Therefore, it is desirable to provide a pair of handle grips to the handles of an ambulatory aid which provide more reliability and comfort to the user.

SUMMARY OF THE INVENTION

In accordance with one aspect of the present invention, there is provided a handle grip for an ambulatory aid, the ambulatory aid including a frame assembly, a plurality of wheels rotatably mounted to the frame assembly for moveably supporting the frame assembly on a support surface, a pair of handles each having the handle grip, extending rearwardly from the frame assembly to be gripped by a person walking behind the frame assembly, the handle grip comprising: a substantially rigid body portion defining a low surface of the handle grip and a hole to receive one of the handles; and a top portion attached to the body portion, the top portion being of soft and resilient material with respect to the body portion.

In accordance with another aspect of the present invention, there is provided a rolling walker for assisting an individual with mobility which comprises a frame assembly having a pair of handles extending rearwardly from the frame assembly; means attached to the frame assembly for rolling movement of the rolling walker along a support surface; and wherein each of the handles includes a handle grip having an increasing width from a front section of the handle grip towards a rear end of the handle grip in a top view thereof, and defining a projection symmetric about a central axis of the handle grip in a transverse cross-sectional view thereof, the central axis extending in a direction at an angle of 25-55 degrees with respect to a vertical direction such that the projections of the respective handle grips extend away from each other.

Other aspects and features of the present invention will be better understood with reference to embodiments of the present invention described hereinafter.

BRIEF DESCRIPTION OF THE DRAWINGS

Reference will now be made to the accompanying drawings showing by way of illustration the embodiments thereof, in which:

FIG. 6A is a rear elevational view of a handle grip attached to a left-handed handle of the walker device according to another embodiment;

FIG. 6B is a rear elevational view of a handle grip attached to a right-handed handle of the walker device according to said other embodiment;

FIG. 7A is a transverse cross-sectional view of the handle grip of FIG. 6A;

FIG. 7B is a transverse cross-sectional view of the handle grip of FIG. 6B; and

FIG. 8 is a transverse cross-sectional view of an upper end of a right-handed handle of the walker device of FIG. 1, showing the positioning device for angularly positioning the handle grip to be attached thereto.

DETAILED DESCRIPTION OF THE PREFERRED EMBODIMENT

Figure 1:
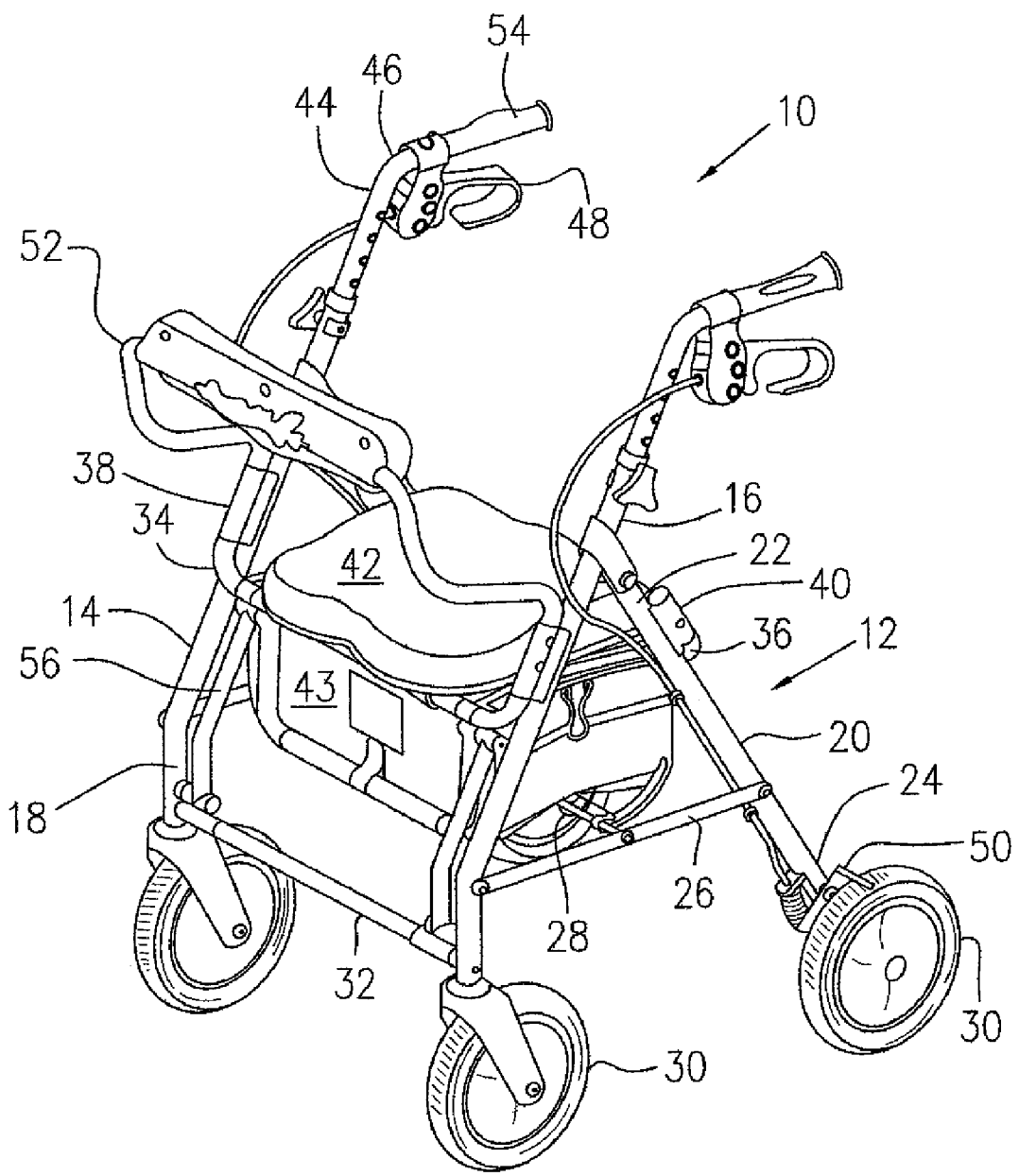
FIG. 1 is an isometric view of a walker device for assisting an individual with mobility according to one embodiment of the present invention.
Figure 2:
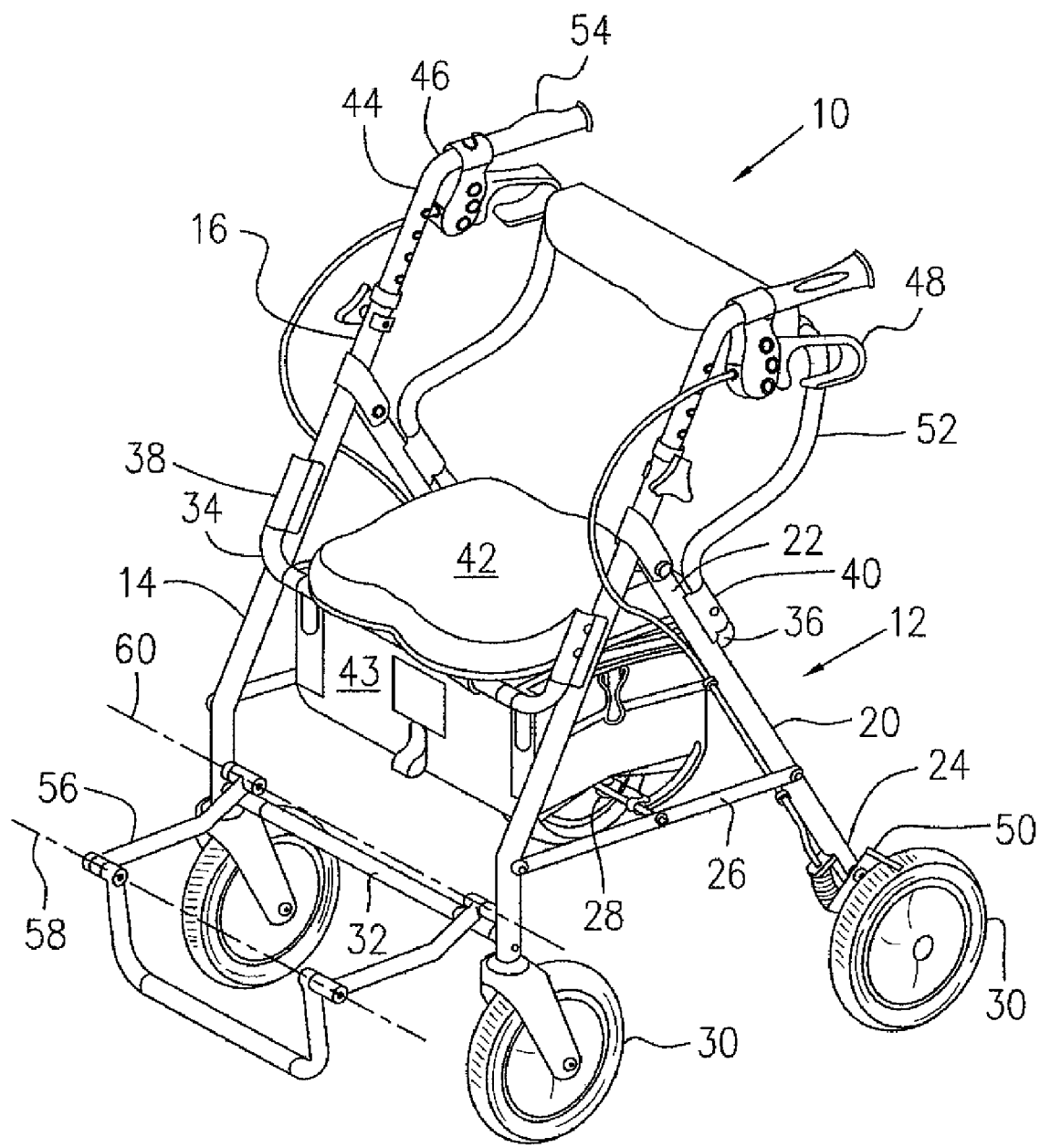
FIG. 2 is an isometric view of the walker device of FIG. 1 converted to a wheeled transportation chair.

Referring to FIGS. 1 and 2, a walker device generally indicated by numeral 10 which is normally used as a rolling walker for assisting an individual with mobility, as shown in FIG. 1, can be temporarily converted into a wheeled transportation chair, as shown in FIG. 2. A similar walker device is described in Applicant's co-pending U.S. patent application Ser. No. 11/522,177 (filed Oct. 26, 2006) which is incorporated herein by reference. The walker device 10 generally includes a frame assembly 12 which has two sides symmetric about a central vertical plane (not shown). For clarity and convenience of illustration, components which are identical on the respective sides of the walker device will be indicated only on one of the sides.

The frame assembly 12 includes two front legs 14 disposed in a substantially parallel relationship on the respective sides, each having an upper end 16 and a lower end 18 thereof. The front legs 14 are disposed in a slanted orientation with the lower end 18 thereof preferably slightly bent in a vertical direction.

The frame assembly 12 further includes two rear legs 20 in a substantially parallel relationship, each having an upper end 22 and a lower end 24 thereof. The rear legs 20 are connected at the upper end 22, preferably through a hinge device (not indicated), to the upper end 16 of the respective front legs 14.

An interconnecting frame, preferably a folding frame assembly, is provided with two foldable rods 26 which are pivotably fastened to the front legs 14 and the rear legs 20 at the respective sides of the frame assembly 12. The foldable rods 26 are provided about a bracing rod 28 which extends transversely across the frame assembly 12 and is pivotably connected to the respective foldable rods 26. Therefore, the frame assembly 12 preferably presents an A-shaped configuration in a side view thereof. However, due to the foldability, the frame assembly 12 can be collapsed into a packing condition for storage and/or transportation.

Rollers, castors and/or small wheels 30 are rotatably mounted to the lower ends 18, 24 of the respective front and rear legs 14, 20 for rolling the walker device 10 along a support surface, for example, a ground surface. The two small wheels 30 attached to the front legs 18 are preferably pivotably fastened to the vertical lower ends 18 such that the two small front wheels 30 are capable of a 360° rotation, which is well known in the industry and will not be further described herein.

The frame assembly 12 is reinforced by cross members 32, 34 and 36, which extend transversely across the frame assembly 12 to interconnect the two sides of the frame structure. The cross members 34, 36 may be made in a U-shape, affixed to the respective front and rear legs 14, 20.

A seat 42 is provided with the frame assembly 12 to extend between the front legs 14 and between the rear legs 20, and is supported on the cross members 34, 36. It is preferable to pivotably attach the seat 42 to one of the cross members 34, 36 (such as to the front cross member 34) and detachably rest the seat 42 on the other (such as the rear cross member 36) such that the seat 32 can be pivoted about one of the cross members 34, 36 to allow the rear legs 20 to pivot towards the front legs 14 when the frame structure 12 must be collapsed. A cloth bag 43 is optionally provided under the seat, for example by being tied to the respective cross members 34, 36.

A pair of handles 44 are provided to the frame assembly 12. Each of the handles 44 may be made of a metal tube which can be slidably received in the upper end 16 of the tubular front legs 14 such that the height of the handles 44 can be adjusted relative to the support surface in accordance with the user's requirements. The handles 44 can be locked in a desired position by a variety of locking means (not indicated) which are well known in the industry and will not therefore be described herein. Each of the handles 44 includes an upper end 46 which is bent at an angle relative to the slanted orientation of the front legs 14 and which extends rearwardly from the frame assembly 12 in order to be gripped by the user. A pair of handle grips 54 are attached to the respective upper ends 46 to allow the user to comfortably and securely grasp the handles 44. A lever assembly 48 may be attached to each of the upper ends 46 for activating a brake 50 mounted to the lower end 24 of the respective rear legs 20 through a cable (not indicated). The lever assembly 48 and the bracket 50 are conventional and will not be further described in detail.

A backrest 52 is detachably and selectively mounted to the frame assembly 12 in brackets 38 for a front position, as shown in FIG. 1, or in brackets 40 for a rear position as shown in FIG. 2, depending on a user's preference for a rear or forward sitting position.

A foldable footrest assembly 56 may be attached to the frame assembly 12 and may pivot about first and second pivoting axes 58, 60 (see FIG. 2), between a folded position as shown in FIG. 1 and an unfolded position as shown in FIG. 2.

Referring to FIGS. 3A-5B, each of the handle grips 54 of FIGS. 1-2 includes a substantially rigid body portion 62 and top portion 64 attached to the body portion 62. The rigid body portion 62 which defines a low surface of the handle grip 54, may be made of a plastic material in a molding process. The top portion 64 is soft and resilient with respect to the rigid body portion 62 and may be made of a suitable resilient and deformable plastic or elastomer in a molding process. However, the top and body portions 64, 62 may also be made in a double injection molding process in which two different molding materials are injected into different cavities of a mold of the handle in different injection steps.

Figure 3A:
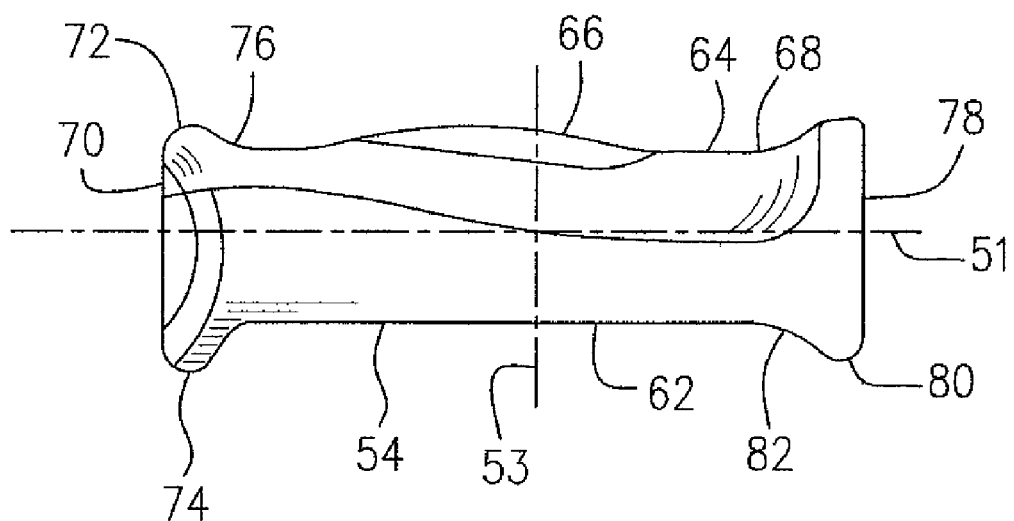
FIG. 3A is a side elevational view of a handle grip which may be used with the walker device of FIG. 1, showing a two-piece configuration of the handle grip including a soft and resilient top portion attached to a rigid body portion thereof.
Figure 3B:
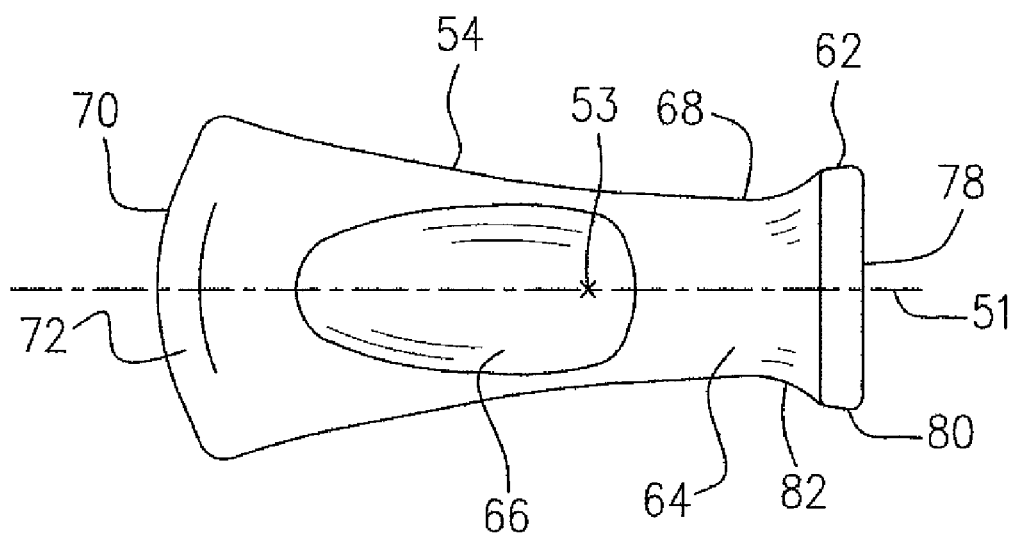
FIG. 3B is a top plane view of the handle grip of FIG. 3A, showing the profile of the handle grip.

The top and body portions 64, 62 of the handle grip 54 in combination, define a profile of the handle grip 54. An upward projection 66 extends from the top portion 64 in a middle location thereof. The handle grip 54 increases in width from a front section 68 thereof towards a rear end 70 in a top plane view of the handle grip 54, as shown in FIG. 3B. It should be note that the top plane view of the handle grip 54 may present a profile thereof different from a profile of the handle grip 54 attached to the handle 44 of the walker device 10, as viewed in a direction from a top of the walker device 10 (not shown) because the handle grip 54 may be angularly positioned on the handle 44, which will be further described hereinafter.

The rear end 70 projects rearwardly to form a convex shape. The handle grip 54 includes a shoulder 72 at the convex rear end 70 extending upwardly from the top portion 64, and a heel 74 of the convex rear end 70 extending downwardly from the body portion 62. A curved transitional surface 76 extends around the handle grip 54 at the rear end 70 thereof to smoothly connect both the upward shoulder 72 and the downward heel 74 to the respective top portion 64 and body portion 52.

The handle grip 54 further includes a front end 78 formed by a front end section of the rigid body portion 62, thereby forming a radially protruding annular ridge 80. A curved transitional surface 82 extends around the handle grip 54 at the front end 78 to smoothly connect the radially protruding annular ridge 80 with the handle grip 54. A major portion of the handle grip 54 defined between the radially protruding annular ridge 80 at the front end 78 and the upward shoulder 72 and downward heel 74 at the rear end 70, is sized in a substantially unchanged dimension in a side view of the handle grip 54 except for the upward projection 66 in the middle thereof, as shown in FIG. 3A.

A hole 84 (illustrated by broken lines in FIGS. 4A and 4B) formed by the body portion 62, is defined in the front end 78 of the handle grip 54 and extends into the body portion 62 substantially along a longitudinal axis 51 of the handle grip 54 in order to engage the upper end 46 of the handle 44 of the walker device 10 of FIG. 1.

The top and body portions 64, 62 of the handle grip 54 are configured such that the top portion 64 forms a top, layer of the handle grip 54 as if the top layer of the handle grip 54 was pealed away to leave a cut off area generally indicated by numeral 86, thereby forming the body portion 62. The cut off area 86 is defined within a complete loop of a cutting edge 88 of the top of the body portion 62. The complete loop of the cutting edge 88 of the body portion 62 is configured and sized to exactly correspond with a peripheral edge 90 of the top portion 64 such that the peripheral edge 90 of the top portion 64 mates substantially seamlessly with the cutting edge 88 of the cut off area 86 of the body portion 62 when the top portion 64 is attached to the body portion 62.

For convenience of description the top and body portions 64, 62 have been described as in a cut off and pealed away manner. In fact, the top portion 64 may be made of a soft and resilient material such as a resiliently deformable plastic or elastomer, and the body portion 62 may be made of a rigid material such as polypropylene or other rigid plastic material. The top and body portions 64, 62 may be made in separate molding processes or in two steps of a double injection molding process.

The top portion 64 is optionally a thin layer except for the upward projection 66, and therefore the body portion 62, is provided with a cross-sectional dimension large enough to define the hole 84 therein. The upward projection 66 is optionally formed entirely by the top portion 64 to provide a suitable resiliency thereof in order to absorb an impact when transferring load from a user's hands therethrough to the walker device 10 and then to the ground.

Figure 4A:
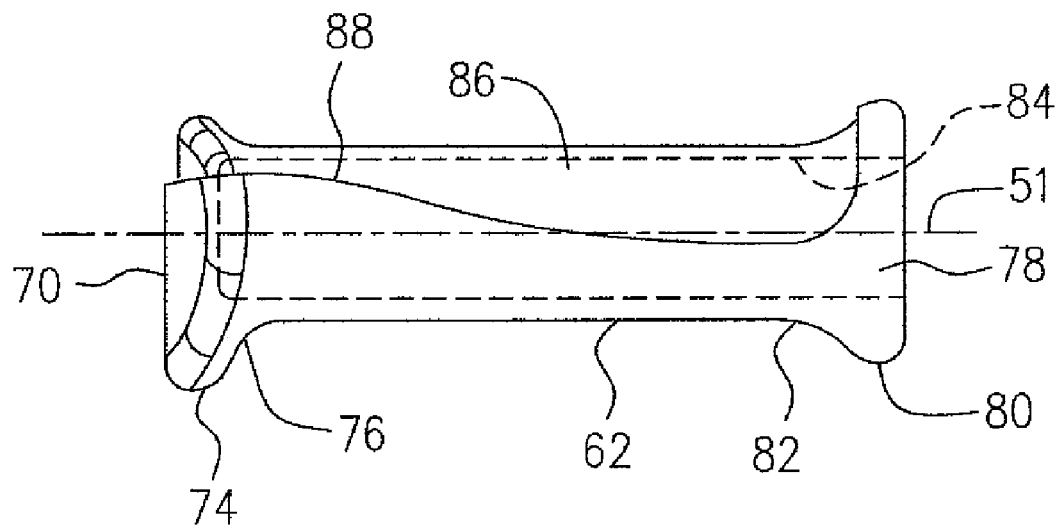
FIG. 4A is a side elevational view of the rigid body portion of the handle grip of FIG. 3A.
Figure 4B:
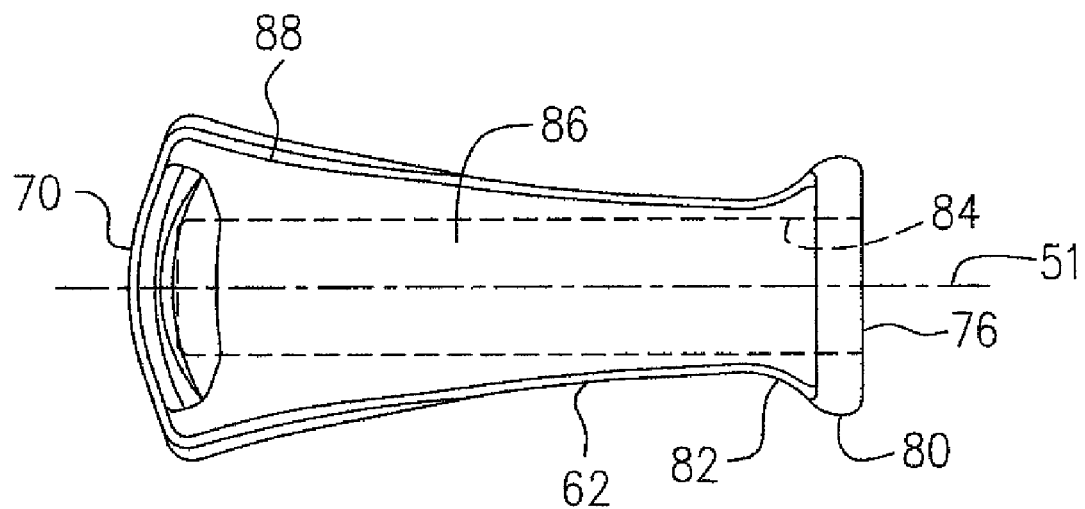
FIG. 4B is a top plane view of the rigid body portion shown in FIG. 4A.
Figure 5A:
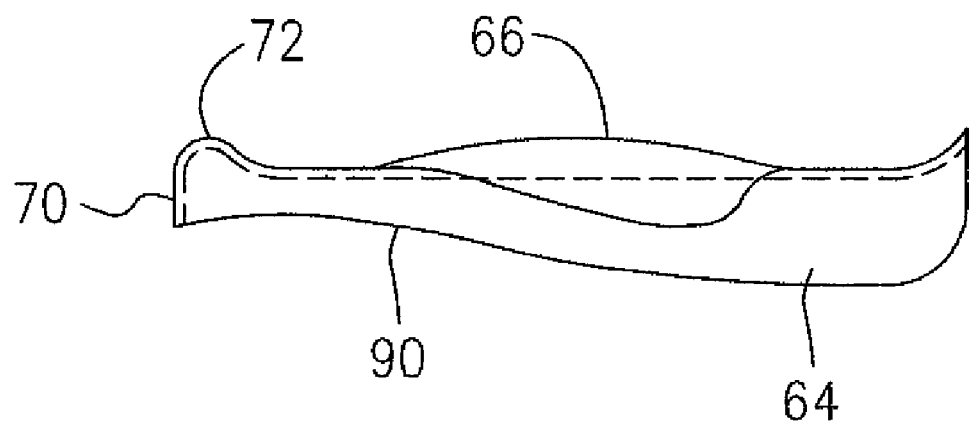
FIG. 5A is a side elevational view of the soft and resilient top portion of the handle grip of FIG. 3A.
Figure 5B:
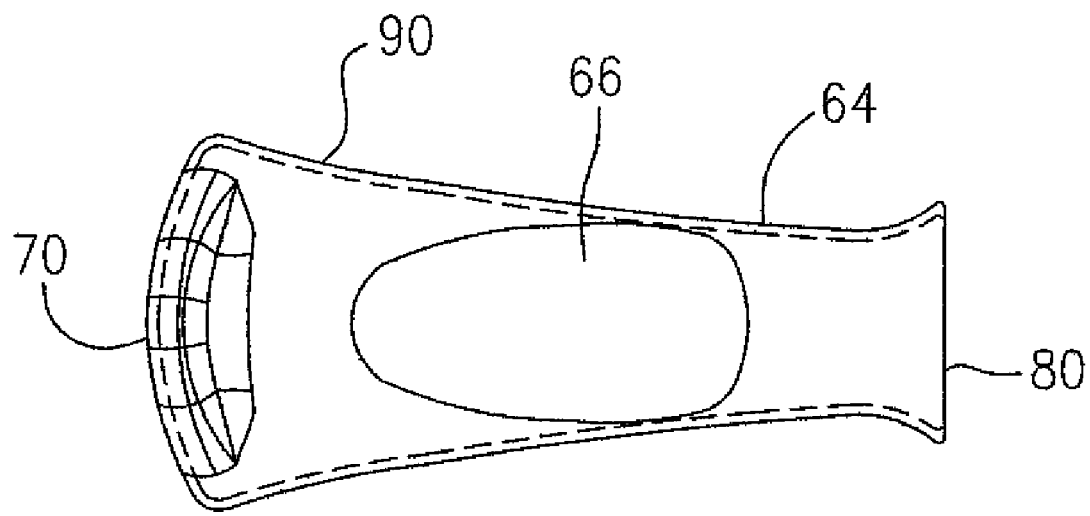
FIG. 5B is a top plane view of the top portion of FIG. 5A.

The configurations of the top and body portions 64, 62 in this embodiment are an example of the present invention and may be configured differently without departing from the spirit of the invention. For example, a rear end section (not indicated) of the top portion 64 may form the entire upward shoulder 72, similar to the upward projection 66, rather than being a thin layer as shown in FIG. 5A with the body portion 62 having a configuration of the rear end section thereof (not indicated) to correspond with such an alternative configuration of the top portion 64. The radially protruding annular ridge 80, for example, may be formed by a combination of both top and body portions 64, 62, instead of being substantially formed by the body portion 62, as shown in FIG. 4A. The handle grip 54 of the present invention is configured to best fit into a user's hand when the walker device 10 is in use and thus provides a very comfortable hand grip. The rigid body portion 62 forms a major part of the configuration and thus provides a solid feeling when the user's hand grasps the handle grip 54. The soft and resilient top portion 64 gives the user a comfortable feeling and is enabled to absorb impact during load transfer from the user's hand through the walker device 10 into the ground. Furthermore, due to the properties of the soft and resilient material, the top portion 64 provides a surface having more frictional resistance than the surface of the body portion 62. This will further benefit the reliable grip because the surface of the top portion 64 is contacted by the palm of the user's hand during load transfer.

The handle grip 54 may be attached to the upper end 46 of each handle 44 of the walker device 10 of FIGS. 1 and 2, in an orientation in which a central axis 53 (see FIGS. 3A and 3B) of the handle grip 54 extends vertically and the upward projection 66 is substantially in a upright position. The central axis 53 of the handle grip 54 is perpendicular to and intersects the longitudinal axis 51. In FIG. 3B the central axis 53 is shown as a point indicated by a cross on the longitudinal axis 51 because the central axis 53 extends into the paper at a right angle thereto. Optionally, the handle grips 54 may be attached to the walker device 10 of FIG. 1 as right-handed and left-handed handle grips in opposite angular orientations, as shown in FIGS. 1 and 2, which is further described below.

Reference is now made to FIGS. 1, 2 and 6A-8. Left-handed and right-handed handle grips 54a, 54b which are shown in respective FIGS. 6A, 7A and FIGS. 6B, 7B, according to another embodiment of the present invention, are substantially identical to the handle grip of FIGS. 3A-3B as a whole. Generally, the handle grips 54a, 54b each has an equal but mirror imaged profile and similar features represented by the handle grip 54 illustrated in FIGS. 3A-3B and those similar components and features will not be redundantly described herein. The respective handle grips 54a, 54b are, however, attached to the upper end 46 of the respective handles 44 of the walker device 10 of FIG. 1 in opposite angular orientations, rather than the position in which the central axis 53 extends vertically as shown in FIG. 3A. In such angular orientations the central axis 53 of the respective handle grips 54a, 54b extends at an angle A with respect to a vertical direction such that the upward projections 66a, 66b extend away from each other, as shown in FIGS. 7A and 7B, while the heels 74a, 74b of the respective handle grips 54a, 54b extend toward each other as shown in FIGS. 6A and 6B.

Although as a whole, the mirror imaged profile of the respective handle grips 54a, 54b is substantially similar to the profile of the handle grip 54 of FIGS. 3A-3B, being symmetrical about the central axis 53 in any transverse cross-sectional view thereof, such as the view of FIG. 7A or 7B, and the rear elevational view as illustrated in FIG. 6A or 6B, the top portion 64a or 64b and the body portion 62a or 62b may be asymmetrical about the central axis 53. In such an asymmetrical configuration, the top portion 64a or 64b which is made of a soft and resilient material with respect to the rigid body portion 62a or 62b, may extend further along the periphery of the handle grip at one side than along the other side. This asymmetric configuration advantageously ensures that a substantially downward load from the user's hands is transferred to the handle grip 54a or 54b through the soft and resilient top portion 64a or 64b when the handle grip 54a or 54b is angularly attached to the walker device 10 of FIG. 1. For this purpose, the asymmetrical configuration of the top portion 64a and 64b or the asymmetrical configuration of the body portion 62a and 62b is different for the respective left-handed and right-handed handle grips, which is clearly illustrated in FIGS. 6A and 6B or 7A and 7B.

The handle grips 54a, 54b angularly attached to the walker device 10 of FIG. 1 advantageously provide a more comfortable and secure hand grip to the user. When a user walks behind the walker device 10 of FIG. 1 and extends his/her arms forwardly to grasp the handle grips 54a, 54b of the walker device, the user's hands are naturally positioned on the handle grips 54a, 54b at an area located at the upper outer side thereof. Therefore, the angularly oriented handle grips 54a, 54b naturally conform to the user's hands. The angle A between the central axis 53 and the vertical direction may be 45 degrees, which may be suitable for most users. Nevertheless, the angle A may also be selected from a range of between 25 degrees and 55 degrees to suit individual user's needs in use of different types or ambulatory aid appliances.

An adhesive may be applied within the hole 84 defined in the body portion 62 of the handle grip 54, to secure the handle grip 54 (or 54a or 54b) to the upper end 46 of the handle 44 of the walker device 10. Alternatively, a positioning device may be provided to the upper end 46 of the handle 44 for securing the handle grip 54 (or 54a or 54b) in any selected angular orientation when attached thereto. For example, as shown in FIG. 8, the upper end 46 may define one or more recesses 94, 96, slots, holes or the like, in selected angular orientations such as indicated by the angle A1, A2, for receiving an inwardly projecting boss 92, a key or the like, which is affixed or integrated to the body portion 62a or 62b, as shown in FIGS. 7A and 7B. The inwardly projecting boss 92, key or the like, may be circumferentially located on the central axis 53 such that the angle A1 or A2 in FIG. 8 indicates the angle between the central axis 53 of the handle grip 54 (or 54a or 54b) and the vertical direction. Angle A1 or A2 is selected from the range of from 25 to 55 degrees.

The walker device 10 described above is an example for describing an ambulatory aid on which the handle grips described in various embodiments above may be used for a comfortable and secure hand grip by a user. Other ambulatory aids such as wheelchairs and strollers are also applicable for use of such handle grips.

The above description is meant to be exemplary only and one skilled in the art will recognize that changes may be made to the embodiments described without departure from the scope of the invention disclosed. For example, a roller walker, a wheelchair or a stroller may be configured differently from the described walker device but still be applicable for use of the handle grips described in the above embodiments. The two-piece handle grip of the present invention may also be configured differently from the exemplary configurations described in the embodiments. Additional features and components may be added to the handle grips described in the embodiments. For example, light reflection plate(s) may be added to a central area of the rear end of the handle grips as shown in FIGS. 6A, 6B (not indicated). Still other modifications which fall within the scope of the present invention will be apparent to those skilled in the art in light of a review of this disclosure, and such modifications are intended to fall within the scope of the appended claims.

We claim:

1. A rolling walker for assisting an individual with mobility comprising:
    a frame assembly having a pair of handles, each including a handle grip extending rearwardly from the frame assembly;
    means attached to the frame assembly for rolling movement of the rolling walker along a support surface; and
    wherein each of the handle grips comprises:
        a substantially rigid body portion defining a low surface of the handle grip and a hole to receive one of the handles, the rigid body portion forming a rigid bottom side of the handle grip, an entire axial length of the rigid bottom side forming the low surface for gripping;
        a top portion attached to the body portion, the top portion being of soft and resilient material with respect to the body portion, a middle area of the soft and resilient material being thicker than an area around the middle area to form in a first view of the handle grip, a projection extending from the top portion in the middle area, the top portion forming a soft and resilient top side opposite to the rigid bottom side of the handle grip; and
        the handle grip in a second view substantially normal to the first view of the handle grip, gradually increasing in width along a substantial length of the handle grip from a front section of the handle grip toward a rear end of the handle grip; and
    wherein the projection is symmetric only about a central axis of the handle grip in a transverse cross-sectional view thereof, the central axis extending in a direction at an angle of 25-55 degrees with respect to a vertical direction such that the projections of the respective handle grips extend away from each other defining a mirror image of the one handle grip relative to the other.

2. The rolling walker as defined in claim 1 wherein the angle of the central axis is 45 degrees.

3. The rolling walker as defined in claim 1 wherein the handle grip comprises a shoulder at the rear end extending in the direction of the central axis outwardly from the top portion of the handle grip and a heel at the rear end extending in the direction of the central axis outwardly from the body portion of the handle grip.

4. The rolling walker as defined in claim 1 wherein the body portion comprises a transverse cross-section asymmetric about the central axis.

5. The rolling walker as defined in claim 1 further comprising a seat attached to the frame assembly.

6. The rolling walker as defined in claim 5 further comprising a detachable backrest adapted to be selectively attached to the frame assembly in one of a front position and a rear position.

7. The rolling walker as defined in claim 1 wherein each of the handles comprises means for positioning the handle grip to be attached thereto, in a selected angular orientation.

8. A handle grip for an ambulatory aid, the ambulatory aid including a frame assembly, a plurality of wheels rotatably mounted to the frame assembly for moveably supporting the frame assembly on a support surface, a pair of handles each having the handle grip, extending rearwardly from the frame assembly to be gripped by a person walking behind the frame assembly, the handle grip comprising:
    a substantially rigid body portion defining a low surface of the handle grip and a hole to receive one of the handles, the rigid body portion forming a rigid bottom side of the handle grip, an entire axial length of the rigid bottom side forming the low surface for gripping;
    a top portion attached to the body portion, the top portion being of soft and resilient material with respect to the body portion, a middle area of the soft and resilient material being thicker than an area around the middle area to form in a first view of the handle grip, a projection extending from the top portion in the middle area, the top portion forming a soft and resilient top side opposite to the rigid bottom side of the handle grip; and
    wherein the handle grip in a second view substantially normal to the first view of the handle grip, gradually increases in width along a substantial length of the handle grip from a front section of the handle grip toward a rear end of the handle grip.

9. The handle grip as defined in claim 8 wherein the handle grip comprises an upstanding shoulder at the rear end extending upwardly from the top portion of the handle grip and a heel at the rear end extending downwardly from the body portion of the handle grip.

10. The handle grip as defined in claim 9 comprising a transverse cross-section symmetric only about a central axis.

11. The handle grip as defined in claim 10 comprising a positioning device to determine an angular orientation of the handle grip when attached to the handle of the ambulatory aid, in which angular orientation the central axis extends in a direction at an angle of 25-55 degrees with respect to a vertical direction.

12. The handle grip as defined in claim 8 wherein the top portion comprises a surface having more frictional resistance than a surface of the body portion.

13. The handle grip as defined in claim 8 wherein the ambulatory aid is a rolling walker.

14. The handle grip as defined in claim 8 wherein the ambulatory aid is a wheel chair.

15. The handle grip as defined in claim 8 wherein the ambulatory aid is a stroller.

* * * * *